United States Patent [19]

Sennett

[11] Patent Number: 4,867,957
[45] Date of Patent: Sep. 19, 1989

[54] PROCESS FOR MAKING POLYPHOSPHAZENES

[75] Inventor: Michael S. Sennett, Maynard, Mass.

[73] Assignee: The United States of America as represented by the Secretary of the Army, Washington, D.C.

[21] Appl. No.: 287,600

[22] Filed: Dec. 19, 1988

Related U.S. Application Data

[63] Continuation of Ser. No. 179,593, Apr. 11, 1988, abandoned.

[51] Int. Cl.$^4$ .............................................. C01B 25/10
[52] U.S. Cl. ..................................................... 423/300
[58] Field of Search ........................................ 423/300

[56] References Cited

U.S. PATENT DOCUMENTS

| | | | |
|---|---|---|---|
| 4,116,891 | 9/1978 | Dieck et al. | 423/300 |
| 4,123,503 | 10/1978 | Snyder et al. | 423/300 |
| 4,226,840 | 10/1980 | Fieldhouse et al. | 423/300 |
| 4,327,063 | 4/1982 | Fieldhouse et al. | 423/300 |
| 4,327,064 | 4/1982 | Fieldhouse et al. | 423/300 |
| 4,374,815 | 2/1983 | Li | 423/300 |
| 4,447,408 | 5/1984 | Li | 423/300 |
| 4,522,795 | 6/1985 | Li | 423/300 |
| 4,522,796 | 6/1985 | Li | 423/300 |
| 4,522,798 | 6/1985 | Lum et al. | 423/300 |

OTHER PUBLICATIONS

"Kinetics and Mechanism of the Boron Trichloride Catalyzed Thermal Ring-Opening Polymerization of Hexachlorocyclotriphosphazine in 1,24 Trichlorobenzine Solution", Macromolecules 1986, vol. 19, pp. 959–964.
Rawls, Chemical & Engineering News, Apr. 27, 1987, pp. 29–30.
Polymer Preprints, American Chemical Society, vol. 28, No. 2, Aug. 1987, pp. 476–477.
Inorganic and Organometallic Polymers, American Chemical Society, Washington, DC, 1988.

*Primary Examiner*—John Doll
*Assistant Examiner*—Wayne A. Langel
*Attorney, Agent, or Firm*—Richard J. Donahue; Saul Elbaum; Mark Goldberg

[57] ABSTRACT

The invention is a continuous polymerization process for producing high molecular weight linear poly(dichlorophosphazene) polymers in dilute solution. Substantially pure cyclic oligomers represented by the formula $(NPCl_2)_n$ are polymerized in dilute solution in an inert solvent at a temperature in the range from 150 degrees Celsius to 300 degrees Celsius for a period of time sufficient to convert a predetermined percentage of oligomer to polymer. The polymer solution may be added to a fresh solution of oligomer, solvent and catalyst to obtain polymers of greater molecular weight. This step may be repeated as many times as necessary to obtain a particular molecular weight. This invention provides a significant improvement in the attainable molecular weight in dilute solution polymerization, with a very high conversion rate of oligomer. The viscosity of the solution during the continuous reaction process is maintained at a level which may be easily handled.

7 Claims, No Drawings

PROCESS FOR MAKING POLYPHOSPHAZENES

This application is a continuation, of application Ser. No. 179,593, filed Apr. 11, 1988, now abandoned The invention described herein may be manufactured, used and licensed by or for the Government for governmental purposes without the payment to me of any royalty thereon.

BACKGROUND OF THE INVENTION

The invention relates to improvements in the solution polymerization of low molecular weight cyclic dichlorophosphazene oligomers to much higher molecular weight substantially linear polydichlorophosphazene polymers. More particularly, the invention relates to the use of solvents and boron catalysts in a dilute solution of substantially pure cyclic dichlorophosphazene oligomers to form substantially linear, substantially gel free, polydichlorophosphazene polymers.

The polymerization of low molecular weight cyclic dihalophosphazenes such as $(NPCl_2)_3$ or $(NPCl_2)_4$ to higher molecular weight linear polydihalophosphazene polymers is well known in the art.

A description of a prior process for polymerizing such cyclic dihalophosphazenes is contained in U.S. Pat. No. 4,327,064 to Fieldhouse et al., issued Apr. 27, 1982. In that patent a simplified solution polymerization process for preparing linear, high molecular weight, polydichlorophosphazene polymers is provided. A highly concentrated solution of oligomer was combined with catalyst and cycloaliphatic solvent, with the reaction allowed to proceed until maximum polymerization had occurred. While this process had certain advantages, there remained certain disadvantages. When batch processing is used, a high viscosity product solution develops at the concentrations of oligomer needed to produce high molecular weight polymer. The maximum obtainable molecular weight polymer was reduced vis-a-vis a bulk (no solvent), uncatalyzed polymerization. The concentration of cyclic oligomer in the starting mixture was far above the solubility limit at room temperature, making a slurry which could not readily be filtered, transferred or otherwise handled. The molecular weights of polymer vary widely from batch to batch depending on reaction conditions and purity of materials used. The instant invention solves each of these problems found in the prior art. It has been found that the use of the continuous reaction process of the instant invention provides a significant improvement in the attainable molecular weight, with a very high conversion rate of oligomer. In addition, the viscosity of the solution during the continuous reaction process is maintained at a level which may be easily handled.

SUMMARY OF THE INVENTION

In accordance with this invention, a continuous solution polymerization process for preparing linear, high molecular weight, ungelled polydichlorophosphazene polymers in dilute solution is provided which minimizes disadvantages encountered in prior solution polymerization processes while obtaining high yields with excellent control of the polymer molecular weight. The polymers produced are precursors to high performance elastomers which retain their properties in all extremes of climates, and are highly resistant to chemical and mechanical degradation.

The process involves the polymerization of substantially pure cyclic dichlorophosphazene oligomers represented by the formula $(NPCl_2)_n$, wherein n is an integer in the range of from 3 to 7, in dilute solution in a hydrocarbon solvent wherein said solvent is inert to attack by the oligomer or by any catalyst used in the process, at a temperature from about 150 degrees Celsius to about 300 degrees Celsius for a period of time sufficient to convert at least 95% of the oligomer to polymer form. A boron trihalide catalyst may be present. The process works particularly well when dilute solutions of the oligomer are used, concentrations in the range of 15% to 20% oligomer by weight, thereby minimizing viscosity buildup during the course of polymerization. However, the process may be practiced when the concentration of oligomer is in the range of 10% to 50% by weight of the solution.

The catalyzed polymerization process is carried out in stages. When polymerization in one stage is complete, the solution is transferred to a second reaction vessel and a fresh solution of the oligomer in dilute solution is added to it. The temperature of the solution is maintained in the range of from about 150 degrees Celsius to about 300 degrees Celsius. The molecular weight is increased at each stage due to the polymer chain end remaining active and not being subject to any termination reaction. The process of adding fresh oligomer to the solution can be repeated as often as necessary to provide a polymer with any molecular weight desired. Molecular weights greater than one million are easily attainable. Extremely high molecular weights are necessary to achieve good mechanical properties in the final elastomeric products.

DETAILED DESCRIPTION OF THE INVENTION

Polydichlorophosphazene polymers which are prepared by the solution polymerization process of the invention are substantially linear ungelled polydichlorophosphazenes having a molecular weight as high as six million.

The process of the invention involves the solution polymerization of substantially pure cyclic dichlorophosphazene oligomers represented by the formula $(NPCl_2)_n$ in a hydrocarbon solvent. Preferably, the solution is in the presence of a boron trihalide catalyst or a catalyst complex of a boron trihalide with an oxygenated phosphorus compound at temperatures which can range from 150 degrees Celsius to 300 degrees Celsius. The polymerization can be carried out in multiple stages because the polymer chain end remains active and is not subject to any termination reaction. Additional quantities of oligomer may be added to the solution in subsequent stages to obtain polymers of greater molecular weight.

The cyclic dichlorophosphazene oligomers which are employed as starting materials in the process of the invention are substantially pure oligomers which are obtained by purification of crude cyclic chlorophosphazene oligomers. A variety of methods of purification are known in the phosphazene art including such methods as extraction, crystallization, distillation, saponification and hydrolysis, treatment with Bronsted base and treatment with water. The preferred purification methods for preparing the substantially pure cyclic oligomers used as starting materials in the process of this invention are recrystallization of the crude cyclic chlorophosphazene oligomers from light hydrocarbon solvent (e.g.

heptane) followed by sublimation. (See U.S. Pat. No. 4,327,064 for a more complete description.)

As indicated, the cyclic dichlorophosphazenes which are employed in the process may be cyclic oligomers represented by the formula $(NPCl_2)_n$ in which n is an integer of from 3 to 7. Of these cyclic oligomers, the cyclic dichlorophosphazene trimer $(NPCl_2)_3$ is preferred. The cyclic oligomer is present in the solution is concentration between 10% and about 50% by weight of the solution. A preferred concentration is between about 15% to about 20% by weight.

Various hydrocarbon solvents may be employed as the solvent medium in the solution polymerization process of the invention. In general, any solvent inert to attack by the catalyst or by the oligomer may be employed. In a closed reaction system, it is desirable that a solvent have a high boiling point to avoid pressure buildup. Thus, cycloaliphatic or aromatic solvents such as decahydronaphthalene (decalin), methyl cyclohexane, 1,2,4-trichlorobenzene, o-dichlorobenzene and the like may be used. However, it was found that the cycloaliphatic solvents were not conducive to polymerization in dilute solutions. Instead, chlorinated benzenes and toluenes such as the dichlorobenzenes and trichlorobenzenes were especially effective. In general, the solvent with the highest dielectric constant is favored since the thermal polymerization of the oligomer is apparently an ionic polymerization.

The process of the invention is especially suitable for use with catalysts, since catalysts tend to lower the molecular weight of the polymer and the process overcomes this. The use of a catalyst is desirable where a substantially pure cyclic chlorophosphazene oligomer is employed as the starting material in order to obtain reasonable rates of reaction at lower temperatures. Prior polymerization processes often employed impure oligomers which did not require the use of catalysts. While the reason for this factor is not entirely clear, it is theorized that the impurities in the oligomers acted as catalysts. However, the use of impure oligomers resulted in widely varying polymerization rates, poor molecular weight control and a tendency toward gellation. Catalysts which may be employed in the process of this invention include boron trihalides. The preferred trihalide for use in the process of the invention is boron trichloride. The advantage of using a catalyst is that the reaction proceeds at lower temperatures and is usually easier to control. The reaction could proceed without a catalyst, but the reaction time would be excessively long.

As indicated, the polymerization temperatures employed in the process can vary over a relatively wide range, i.e., 150 to 300 degrees Celsius. However, a preferred temperature range is from 180 to 250 degrees Celsius.

The rate of oligomer to polymer conversion is variable and dependent on several factors including temperature, catalyst concentration and oligomer concentration. Typically, reaction time will range from 4 to 96 hours. In the following examples, 48 hours is adequate for greater than 95% conversion to polymer. The reaction is allowed to continue for a sufficient time period to convert more than 95% of the oligomer to polymer.

EXAMPLE 1

Into a clean, flame-dried 30 ml glass polymerization tube was placed 3.0 g purified hexachlorocyclotriphosphazene and 16 g 1,2,4-trichlorobenzene (TCB). The tube was evacuated on a vacuum line and 0.66 g $BCl_3$ was distilled into it. The tube was cooled to 77 K and sealed with a flame. The tube was polymerized 54 hours at 210 degrees Celsius. The tube was opened and the contents analyzed by high performance size exclusion chromatography (SEC) using polystyrene calibration standards. The polymer had $M_n$ 13,000 and $M_W$ 37,000. This polymer was placed in a new polymerization tube along with 3.0 g hexachlorocyclotriphosphazene and 16 g TCB. The tube was evacuated and 1.19 g $BCl_3$ was added. After 49 hours at 210 degres Celsius, the polymer had $M_n$ 100,000 and $M_W$ 118,000. The polymer solution was transferred to a third tube with an additional 3.0 g hexachlorocyclotriphosphazene, 16 g TCB ad 1.51 g $BCl_3$. The tube was heated 46 hours at 210 degrees Celsius, after which time the polymer was recovered having a $M_n$ 322,000 and $M_W$ 536,000. At the end of each step the amount of hexachlorocyclotriphosphazene remaining unreacted was less than 5% of the original concentration.

EXAMPLE 2

A 30 ml polymerization tube as in Example 1 was filled with 3.0 g hexachlorocyclotriphosphazene, 16 g TCB and 0.52 g $BCl_3$. The sample was heated 21 hours at 210 degrees Celsius to yeild a polymer with $M_n$ 254,000 and $M_W$ 574,000. The polymer solution was transferred to a second polymerization tube and 3.0 g hexachlorocyclotriphosphazene, 16 g TCB and 1.27 g $BCl_3$ added as before. This tube was heated 70 hours at 210 degrees Celsius to yield a polymer with $M_n$ 574,000 and MW 751,000.

The highest $M_W$ achieved was 6,00,000 when measured by light scattering. The narrow $M_W/M_N$ ratio of about 1.3 is significant in that the prior art for high molecular weight production generally gives an $M_W/M_N$ in the 5–10 range.

The process of the invention is particularly attractive when used with dilute solutions of the oligomer, that is when the oligomer makes up less than 50% of the total reaction mixture. The dilute solution polymerization is advantageous in that viscosity buildup is minimized during the course of polymerization. Even at high polymerization levels, the viscosity of the reaction mixture is no higher than that of light weight motor oil. Dilute solution polymerizatin has not been very successful in the past because the ultimate molecular weight of the polymer produced has been limited. This process could be easily adapted to production-sized lots due to the low viscosity which would allow the polymer to be pumped through pipelines. The polymer chain produced by this invention has a "living" chain end, that is, it remains chemically active and is not subject to any termination reaction. Even after transfer from one vessel to another and the addition of fresh reactants, the polymer chains are able to continue to grow. The process of adding fresh amounts of the oligomer to an ongoing reaction can be repeated as often as required to produce a polymer with any molecular weight desired. The process could be continuous through a series of linked reactor vessels forming a continuous flow path. The number of reactor vessels used would be dependent on the ultimate molecular weight desired. No limitation on molecular weight is then imposed by conducting the reaction in dilute solution. The process allows essentially complete conversion to polymer with at a minimum over 95% of the oligomer to be converted to polymer. This is an important attribute of the invention since many traditional processes, especially when practiced in non-solvent systems, are limited to 50% conversion. It is possible to attain such high conversion rates because the dilute solution prevents high viscosity build-up and reduces the tendency to form a crosslinked gel.

The polychlorophosphazenes produced by this invention are used to prepare high performance elastomers or artificial rubber materials. Products prepared from polydichlorophosphazene have an extremely wide service temperature range together with excellent chemical and environmental resistance. This combination of properties makes polyphosphazenes suitable for many demanding applications in aerospace environments, military systems and industrial processes.

I claim:

1. A continuous polymerization process for producing high molecular weight linear polydichlorophosphazene polymers in dilute solution which comprises:
   (a) polymerizing substantially pure cyclic oligomers represented by the formula $(NPCl_2)_n$ in a solution, wherein n is an integer in the range from 3 to 7, said solution comprising a dilute concentration of said oligomer in a quantity of trichlorobenzene solvent, wherein said oligomer is present in concentrations from 10% to 50% by weight of said solution, with a boron trihalide catalyst, maintaining said solution in a vessel at a temperature of from about 150 degrees Celsius to about 300 degrees Celsius for a sufficient amount of time to convert substantially all of said oligomer to a polymer;
   (b) adding the polymer solution obtained in (a) above to a fresh solution of the same oligomer, solvent and catalyst and then heating to a temperature in the range from about 150 degrees Celsius to about 300 degres Celsius for sufficient time to convert substantially all of said oligomer to polymer; and
   (c) repeating step (b) until the molecular weight of said polymer reaches a value in the range from 500,000 to 6,000,000.

2. The process of claim 1 wherein said oligomer is a trimer represented by the formula $(NPCl_2)_3$.

3. The process of claim 2 wherein said catalyst is boron trichloride.

4. The process of claim 2 wherein said cyclic oligomer is between 15% to 20% by weight of said solution.

5. The process of claim 4 wherein over 95% of said oligomer is converted to a polymer.

6. The process of claim 5 wherein each addition of said solution results in a longer polymer chain.

7. The process of claim 6 wherein $M_W/M_N$ is about 1.3.

* * * * *

UNITED STATES PATENT OFFICE
CERTIFICATE OF CORRECTION

PATENT NO. : 4,867,957
DATED : September 19, 1989
INVENTOR(S) : Michael S. Sennett It is certified that error appears in the above-identified patent and that said Letters Patent is hereby corrected as shown below:

In column 4, at line 26, the word "yeild" should read --yield--.

In column 4, at line 33, the number "6,00,000" should read --6,000,000--.

In column 4, at line 46, the word "polymerizatin" should read --polymerization--.

In column 5, at line 20, the formula "$(NPC_{12})_n$" should read --$(NPCl_2)_n$--.

Signed and Sealed this

Twenty-eighth Day of August, 1990

Attest:

HARRY F. MANBECK, JR.

*Attesting Officer*    *Commissioner of Patents and Trademarks*